United States Patent
Heaven, Jr. et al.

(10) Patent No.: US 7,156,342 B2
(45) Date of Patent: Jan. 2, 2007

(54) SYSTEMS FOR ACTIVELY CONTROLLING THE AEROSTATIC LIFT OF AN AIRSHIP

(75) Inventors: George H. Heaven, Jr., North Las Vegas, NV (US); Michael K. Walden, North Las Vegas, NV (US)

(73) Assignee: LTAS Holdings, LLC, Las Vegas, NV (US)

( * ) Notice: Subject to any disclaimer, the term of this patent is extended or adjusted under 35 U.S.C. 154(b) by 0 days.

(21) Appl. No.: 10/952,300

(22) Filed: Sep. 27, 2004

(65) Prior Publication Data

US 2006/0065777 A1     Mar. 30, 2006

(51) Int. Cl.
*B64B 1/02* (2006.01)

(52) U.S. Cl. .......................... 244/30; 244/125
(58) Field of Classification Search ................ 246/96, 246/97, 30, 125–127, 31, 33
See application file for complete search history.

(56) References Cited

U.S. PATENT DOCUMENTS

| | | | |
|---|---|---|---|
| 998,538 A * | 7/1911 | Lehman | 244/97 |
| 1,577,756 A * | 3/1926 | Reagan | 244/97 |
| 1,795,335 A * | 3/1931 | Hall | 244/97 |
| 1,972,242 A * | 9/1934 | Morse | 244/97 |
| 2,094,619 A * | 10/1937 | Reichert et al. | 244/97 |
| 3,420,473 A * | 1/1969 | Krafft | 244/30 |
| 3,963,198 A | 6/1976 | Vaughan | |
| 3,971,533 A | 7/1976 | Slater | |
| 3,972,492 A | 8/1976 | Milne | |
| 3,972,493 A | 8/1976 | Milne | |
| 4,009,850 A | 3/1977 | Hickey | |
| 4,014,483 A | 3/1977 | MacNeill | |
| 4,032,085 A | 6/1977 | Papst | |
| 4,047,729 A | 9/1977 | Smith | |
| 4,085,912 A | 4/1978 | Slater | |
| 4,089,492 A | 5/1978 | Lang | |
| RE30,129 E | 10/1979 | Crompton | |
| 4,269,375 A | 5/1981 | Hickey | |
| 4,272,042 A | 6/1981 | Slater | |
| 4,326,681 A * | 4/1982 | Eshoo | 244/30 |
| 4,591,112 A | 5/1986 | Piasecki et al. | |
| 4,606,515 A | 8/1986 | Hickey | |
| 4,967,983 A | 11/1990 | Motts | |
| 5,005,783 A | 4/1991 | Taylor | |
| 5,071,090 A | 12/1991 | Takahashi et al. | |
| 5,110,070 A | 5/1992 | Hagenlocher et al. | |
| 5,240,206 A | 8/1993 | Omiya | |
| 5,285,986 A | 2/1994 | Hagenlocher | |
| 5,294,076 A | 3/1994 | Colting | |

(Continued)

OTHER PUBLICATIONS

"Lighter-Than-Air High Altitude Platform Feasibility Study," Luffman, C.R., (May 9, 2004).

(Continued)

*Primary Examiner*—Galen Barefoot
(74) *Attorney, Agent, or Firm*—Snell & Wilmer LLP (57) ABSTRACT

Various embodiments of the invention relate generally to systems for providing active vertical control of an airship. More particularly, at least one embodiment of the invention relates to a system for actively controlling the aerostatic lift of an airship by manipulating the ratio of air to lifting gas contained within the airship, and thus the overall mass of the airship. This manipulation is accomplished by actively compressing and/or decompressing the lifting gas or internal air, with the resulting pressure differential borne primarily by the hull and/or an internal pressure tank depending upon the configuration.

30 Claims, 8 Drawing Sheets

U.S. PATENT DOCUMENTS

| | | | |
|---|---|---|---|
| 5,333,817 A * | 8/1994 | Kalisz et al. | 244/97 |
| 5,348,251 A | 9/1994 | Ferguson | |
| 5,348,254 A | 9/1994 | Nakada | |
| 5,358,200 A | 10/1994 | Onda | |
| 5,383,627 A | 1/1995 | Bundo | |
| 5,538,203 A * | 7/1996 | Mellady | 244/97 |
| 5,645,248 A | 7/1997 | Campbell | |
| 5,697,579 A | 12/1997 | Hayashi | |
| 5,713,536 A | 2/1998 | Bata | |
| 5,755,402 A * | 5/1998 | Henry | 244/29 |
| 5,810,286 A | 9/1998 | Matsler | |
| 5,890,676 A | 4/1999 | Coleman et al. | |
| 5,909,857 A | 6/1999 | Filimonov | |
| 5,931,413 A | 8/1999 | Hayashi | |
| 6,010,093 A | 1/2000 | Paulson | |
| 6,019,311 A | 2/2000 | Thyen | |
| 6,019,317 A | 2/2000 | Simmons et al. | |
| 6,116,538 A | 9/2000 | Häfelfinger | |
| 6,119,979 A | 9/2000 | Lee et al. | |
| 6,119,983 A | 9/2000 | Provitola | |
| 6,182,924 B1 | 2/2001 | Nott | |
| 6,189,829 B1 | 2/2001 | Brotz | |
| 6,196,498 B1 | 3/2001 | Eichstedt et al. | |
| 6,286,783 B1 | 9/2001 | Kuenkler | |
| 6,293,493 B1 | 9/2001 | Eichstedt et al. | |
| 6,302,357 B1 | 10/2001 | Kalisz | |
| 6,305,641 B1 * | 10/2001 | Onda | 244/30 |
| 6,311,925 B1 | 11/2001 | Rist | |
| 6,315,242 B1 | 11/2001 | Eichstedt et al. | |
| 6,354,535 B1 | 3/2002 | Perry et al. | |
| 6,357,700 B1 | 3/2002 | Provitola | |
| 6,371,409 B1 | 4/2002 | Steele | |
| 6,382,557 B1 | 5/2002 | Lafuma et al. | |
| 6,386,480 B1 | 5/2002 | Perry et al. | |
| 6,425,552 B1 | 7/2002 | Lee et al. | |
| 6,427,943 B1 | 8/2002 | Yokomaku et al. | |
| 6,439,148 B1 | 8/2002 | Lang | |
| 6,467,724 B1 | 10/2002 | Kuenkler | |
| 6,471,159 B1 | 10/2002 | Bundo | |
| 6,527,223 B1 | 3/2003 | Mondale | |
| 6,540,178 B1 | 4/2003 | Hillsdon | |
| 6,568,631 B1 | 5/2003 | Hillsdon | |
| 6,581,873 B1 | 6/2003 | McDermott | |
| 6,607,163 B1 | 8/2003 | Perry et al. | |
| 6,609,680 B1 | 8/2003 | Perry et al. | |
| 6,648,272 B1 * | 11/2003 | Kothmann | 244/97 |
| 6,698,686 B1 | 3/2004 | Ogawa et al. | |
| 6,708,922 B1 | 3/2004 | Hamilton | |
| 6,811,115 B1 | 11/2004 | Kurose | |
| 6,837,458 B1 | 1/2005 | Swearingen et al. | |

OTHER PUBLICATIONS

"AeroRaft—A Brief Insight," Luffman, C.R., (Mar. 21, 2005).

* cited by examiner

SYSTEMS FOR ACTIVELY CONTROLLING THE AEROSTATIC LIFT OF AN AIRSHIP

FIELD OF THE INVENTION

Various embodiments of the invention relate generally to systems for providing active vertical control of an airship. More particularly, at least one embodiment of the invention relates to a system for actively controlling the aerostatic lift of an airship by manipulating the ratio of air to lifting gas contained within the airship, and thus the overall mass of the airship. This manipulation is accomplished by actively compressing and/or decompressing the lifting gas, with the resulting pressure differential borne primarily by the hull and/or an internal pressure tank depending upon the configuration.

DESCRIPTION OF THE RELATED ART

Conventional lighter-than-air or buoyant aircraft (commonly referred to as "airships") employ a lighter-than-air lifting gas, typically helium, to provide buoyancy or "lift." Temperature and pressure changes resulting from altitude changes and varying atmospheric conditions generally cause the helium contained within the hull of the airship to expand or contract, resulting in a constantly varying volume of helium. To maintain a constant internal pressure, conventional airships employ one or more fabric ballonets. The fabric ballonets are a passive system that reacts to changes in helium volume by passively filling with outside air, or exhausting air to the atmosphere, to compensate for changes in helium volume and maintain hull pressure within acceptable limits. A conventional airship is pressurized only to the minimum extent necessary to maintain its hull shape under flight and mooring loads.

Positive buoyancy (sometimes described as the airship being "statically light") is obtained when the amount of buoyancy or "lift" generated by the lifting gas is greater than the mass (weight) of the airship and its payload, thereby enabling the airship to ascend without the need for any other form of assistance, such as dynamic lift and/or vectored engine thrust. Negative buoyancy (sometimes described as the airship being "statically heavy") is obtained when the amount of buoyancy or "lift" generated by the lifting gas is less than the mass (weight) of the airship and its payload, thereby causing the airship to descend and preventing it from ascending or remaining aloft without employing some other form of assistance, such as dynamic lift and/or vectored engine thrust. In a conventional airship, the pilot and crew have no way of actively manipulating the buoyancy of the airship other than releasing helium into the atmosphere or releasing disposable ballast (such as sand or water).

To compensate for the loss of weight during a flight as fuel is consumed, a conventional airship usually begins its flight statically heavy. To overcome this heaviness and become airborne, the airship either has to generate dynamic lift by performing a takeoff run similar to that of an airplane (but generally of shorter length), or, if so equipped, by using vectored engine thrust to ascend to an altitude where the additional weight can again be carried by forward movement and dynamic lift. Even if the airship takes off statically heavy, it normally arrives at its destination statically light, after fuel is consumed during the flight, making the landing maneuver very difficult. In a conventional airship, this statically light condition can be overcome only by employing negative lift to force the airship down via forward airspeed, or by employing vectored engine thrust to force the airship downward. The negative lift method requires a minimum length of runway or similar cleared surface for useful operation, while the vectored engine thrust method consumes a great deal of fuel and requires expensive vectored engines.

Another drawback of conventional airships is the difficulty experienced in offloading passengers and cargo. That is, as passengers and cargo are offloaded, the airship becomes increasingly buoyant. Therefore, ballast (such as sand or water) must be loaded onto the airship to compensate for the increased buoyancy and subsequently offloaded to allow the airship to become airborne again. Alternatively, the airship may be firmly affixed to the ground via cables or other fastening devices, or through a constantly compensating downward force generated by vectored engine thrust.

SUMMARY OF THE INVENTION

One embodiment of the invention provides an active density control buoyancy (DCB) system that allows an airship or other lighter-than-air vehicle to achieve vertical take off and landing (VTOL) without dynamic lift or vectored engine thrust, by manipulating the ratio of air to lifting gas contained within the airship, and thus the overall mass of the airship. This manipulation is accomplished by actively compressing and/or decompressing the lifting gas, with the resulting pressure differential borne primarily by the hull and/or an internal pressure tank depending upon the configuration. In addition to providing vertical control, the DCB system can also be used to compensate for changes in the static weight of the airship as a result of operational factors such as fuel consumption, payload exchange, ambient temperature change, lifting gas positive or negative superheat, humidity and/or ambient air pressure changes.

One embodiment of the invention provides an active DCB system in which a fixed-volume hull is filled with a lifting gas to provide lift to an airship. One or more flexible compartments and/or one or more fixed volume tanks are disposed within the hull having one or more pumps and valves to receive and release air. A controller is configured to pump the air from outside the airship and into the one or more flexible compartments and/or tanks under pressure. In the case of the flexible compartments, the air is pumped into them, inflating them under pressure and in turn compressing the lifting gas against the hull. As the lifting gas is compressed and displaced by the one or more flexible compartments, the airship becomes statically heavier and less buoyant. In the case of a tank, the air is pumped into the tank under pressure, increasing the mass of air within the tank and compressing the air within the tank. As the mass of air within the tank increases, the airship becomes statically heavier and less buoyant. In either case, if a sufficient amount of air is pumped on board, the airship will become statically heavy enough to descend to the ground and even to remain grounded as payload is offloaded. Conversely, if a sufficient amount of air is released, the airship will become statically light enough to ascend. By pumping varying amounts of air into and out of the airship, the static weight of the airship (and thus its rate of ascent and/or descent) can be precisely controlled.

Another embodiment of the invention provides an active density control system for an airship including a fixed-volume hull to hold a lifting gas and a fixed-volume tank disposed within the hull, the fixed-volume tank having one or more pumps and/or valves to receive and release the lifting gas. A controller is configured to pump the lifting gas from the hull and into the fixed-volume tank. As the lifting gas is pumped into the tank under pressure, it is replaced by air that is pumped from the atmosphere into one or more flexible compartments disposed inside the hull. The airship becomes statically heavier by an amount substantially equal to the mass of the air pumped on board and the compression of the lifting gas. The controller is further configured to release the pressurized lifting gas from the fixed-volume tank back into the hull. As the lifting gas reenters the hull, air is forced or released from the one or more flexible compartments. The airship becomes statically lighter by an amount substantially equal to the mass of air displaced by the decompressing lifting gas and released back into the atmosphere. In this manner the static weight of the vehicle can be altered as desired, thus providing vertical control of the airship. In this embodiment, the greatest pressure differential is borne by the fixed-volume tank, and therefore the ability of the fixed-volume tank to withstand pressure is important.

Another embodiment of the invention provides an active density control system for an airship including a hull configured to hold a lifting gas, a fixed-volume tank contained within the hull and configured to hold air, a first outlet device for releasing air from the fixed-volume tank to decrease the static weight of the airship, and a first inlet device for introducing air into the fixed-volume tank to increase the static weight of the airship. The system may also include one or more flexible compartments contained within the hull and configured to hold air. Also, the system may include a second outlet device for releasing air from the one or more flexible compartments to decrease the static weight of the airship, and a second inlet device for introducing air into the one or more flexible compartments to increase the static weight of the airship.

Another embodiment of the invention provides an active density control system for an airship including a fixed-volume hull to hold a lifting gas and a fixed-volume tank disposed within the hull, the fixed-volume tank having a first section to hold air and a second section to hold the lifting gas, the two sections of the fixed-volume tank separated by a flexible, gas impermeable divider. One or more valves and/or pumps serve to move air and/or the lifting gas into and out of the fixed-volume tank. In one embodiment, a controller is configured to control the one or more valves and/or pumps to pump air into the first section of the tank, forcing the lifting gas in the second section of the tank into the hull via a valve. In this embodiment, the greatest pressure differential is borne by the hull. In a second embodiment, a controller is configured to control the one or more valves and/or pumps to pump air into the first section of the tank, compressing the lifting gas in the second section of the tank. In the second embodiment, the greatest pressure differential is borne by the fixed-volume tank. In these embodiments, the mass of air pumped into the tank increases the static weight of the airship. The controller is also configured to control the one or more valves and/or pumps to release air from the tank back into the atmosphere, thereby decreasing the static weight of the airship. In the first embodiment, the compressed lifting gas within the hull is allowed to expand back into the fixed-volume tank via a pump or valve. In the second embodiment, the lifting gas in the second section of the tank expands as it is depressurized.

The hull and/or the fixed-volume tank should be constructed to withstand the required pressure differentials. The hull may be non-rigid, semi-rigid, rigid or monocoque. The one or more flexible compartments may be made from fabric, plastic, polymers, composites or other flexible, gas-impermeable textiles. The fixed-volume tank may be made from fabric, lightweight metal, plastic, polymers, composites or other lightweight, gas-impermeable materials or textiles.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. For instance, the term "density control buoyancy system" or "DCB system" as described herein may include, but is not necessarily limited to, a system for adjusting the aerostatic lift of an airship by altering the ratio of air to lifting gas contained within the airship, and thus the overall mass of the airship. The term "airship" as described herein may include, but is not necessarily limited to, an aircraft, an airship, a blimp, a hybrid aircraft and/or any other vehicle that employs a lifting gas. In one embodiment, the DCB system may include, but is not necessarily limited to, one or more tanks and/or one or more flexible compartments. The term "tank" as described herein may include, but is not necessarily limited to, a device capable of holding a fluid, a gas and/or other substance and capable of withstanding a specific internal pressure and/or external pressure. The tank may be shaped in the form of, for example, a circle, an ellipse, a sphere, a cylinder, a donut, a toroid, or any other shape suitable for containing a pressurized gas given the configuration of the airship in question, or any combinations thereof. The term "hull" as described herein may include, but is not necessarily limited to, a monocoque, rigid, semi-rigid or non-rigid hull, envelope or other enclosure capable of holding a fluid, a gas and/or other substance and capable of withstanding a specific internal pressure and/or external pressure. The term "flexible compartment" as described herein may include, but is not necessarily limited to, a chamber, a bag, a balloon, a cell, a tube or any other flexible, gas-impermeable enclosure. The hull, tank and/or flexible compartment may be constructed from a wide variety of materials including, but not necessarily limited to, light metals, composites and/or fabrics formed in a variety of sizes and shapes.

Figure 1:
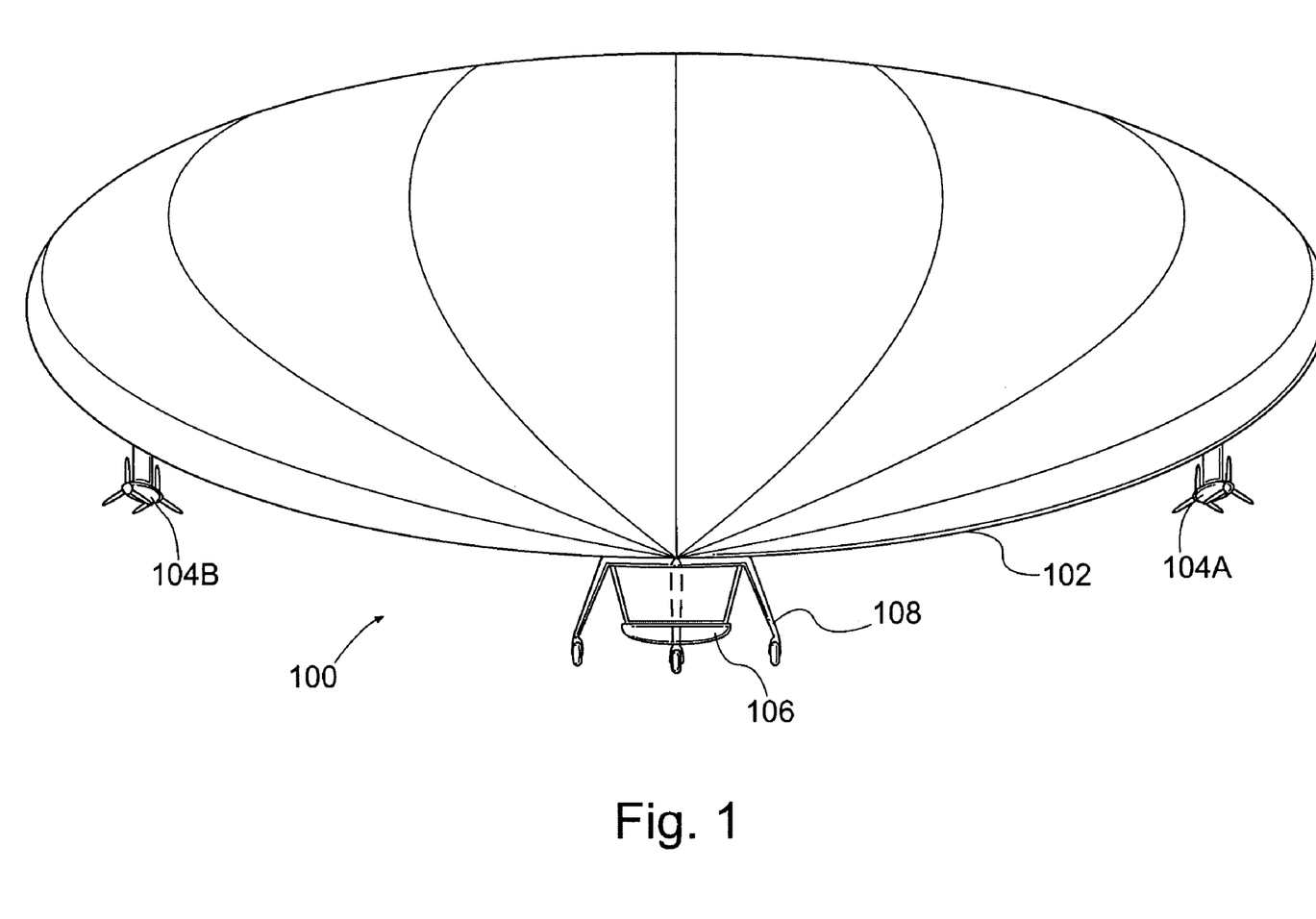
FIG. 1 illustrates a front perspective view of an airship that employs a density control buoyancy system for controlling the ascent and descent of the airship according to one embodiment of the invention.

FIG. 1 illustrates a front perspective view of an airship 100 that employs a DCB system according to one embodiment of the invention. The hull 102 may be made of a flexible (e.g., fabric) and/or rigid (e.g., lightweight metal or composite) material, or a combination thereof, that provides structural integrity to the airship 100, alone or in conjunction with, an internal structural framework. The hull 102 may be configured in the shape of a sphere, a flattened sphere or ellipse (i.e., lenticular or "saucer" shape), a donut, a toroid, a cigar (i.e., resembling a traditional blimp), and various other aerodynamic shapes.

The hull 102 may be designed to contain one or more lifting gases (e.g., helium, hydrogen, heated air, oxygen, other gases, and/or combinations thereof) or to enclose one or more chambers (e.g., balloons or cells) that may contain the one or more lifting gases. The lifting gases may provide all or most of the lift so that little or no additional energy is expended to lift the airship 100 in the air. In one embodiment, the hull 102 and/or an internal pressure tank(s) may be pressurized.

The airship 100 may be rigid (an airship whose shape is maintained by an internal framework covered with fabric and whose lifting gas is contained in a separate chamber or chambers within the internal framework), semi-rigid (an airship with a rigid keel and an envelope shape maintained by internal gas pressure) or non-rigid (an airship with an envelope shape maintained only by internal gas pressure). In one embodiment, the hull 102 may also be a monocoque hull made up of rigid, gas-impermeable composite sections directly containing one or more lifting gases. The monocoque hull provides rigidity to the airship 100 without requiring a separate rigid internal framework. In another embodiment, the hull 102 includes a pressurized flexible fabric envelope that is stabilized with a composite or metal framework ring disposed around the perimeter of the hull 102.

The airship 100 may also include one or more propulsion devices or systems 104, including, but not necessarily limited to, propellers, engines, motors, electro-kinetic drives and/or jets, which serve to generate a thrust to move the airship 100 in a particular direction. The propulsion system 104A may operate in the same or in a different manner as the propulsion system 104B. The airship 100 may also include a cabin 106 to house an operator, passengers, cargo, equipment, a control room, etc. As shown in FIG. 1, the cabin 106 may be positioned outside the hull 102 and centered about the underside of the hull 102 (see also FIG. 2). In other embodiments, the cabin 106 may be located either inside or outside the hull 102 at various locations. The airship 100 may include a plurality of landing supports and wheels 108 for takeoff and landing.

Figure 2:
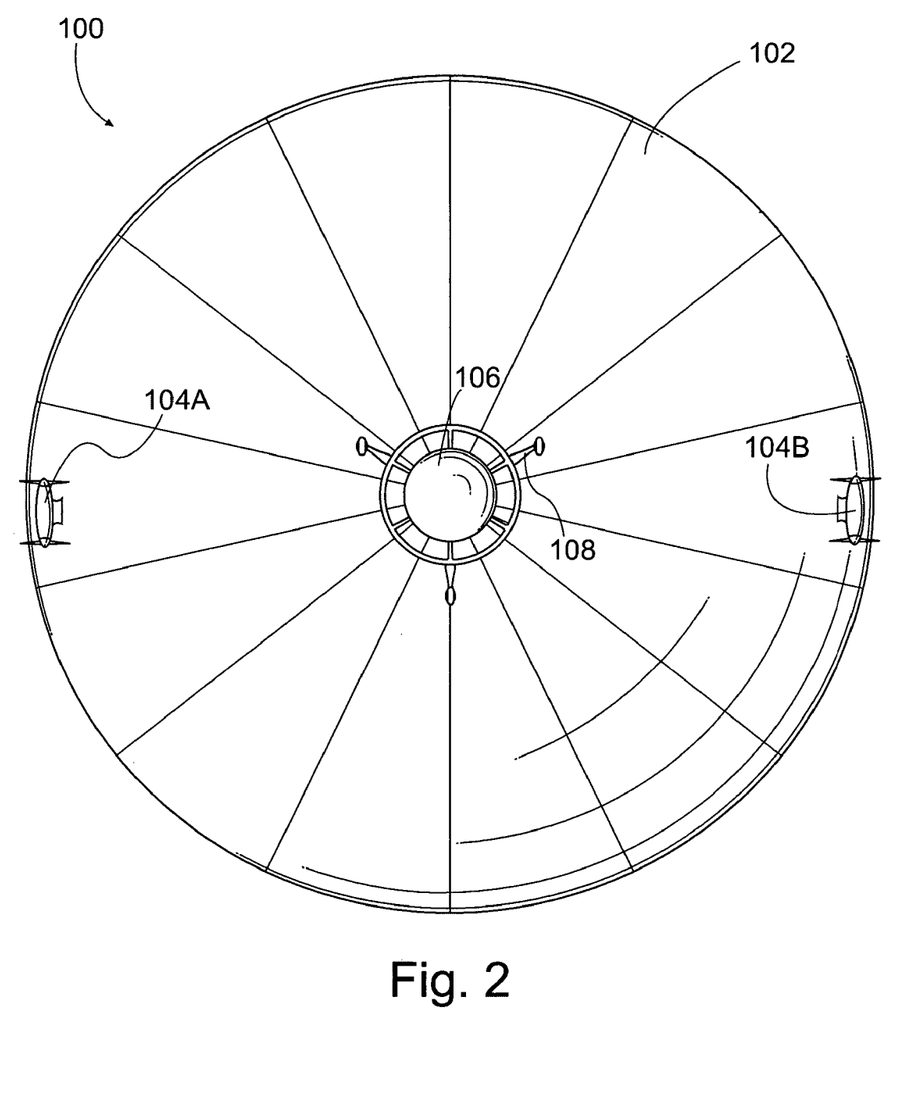
FIG. 2 illustrates an underside view of the airship of FIG. 1 that employs a density control buoyancy system for controlling the ascent and descent of the airship according to one embodiment of the invention.

FIG. 2 illustrates an underside view of the airship 100 of FIG. 1 that employs a DCB system according to one embodiment of the invention. In one embodiment of the invention, the airship 100 has a lenticular hull 102. As shown, the cabin 106 may be centered about the underside of the airship 100 and the two propulsion systems 104A and 104B may be disposed at the underside and at opposite sides of the airship 100.

Figure 3A:
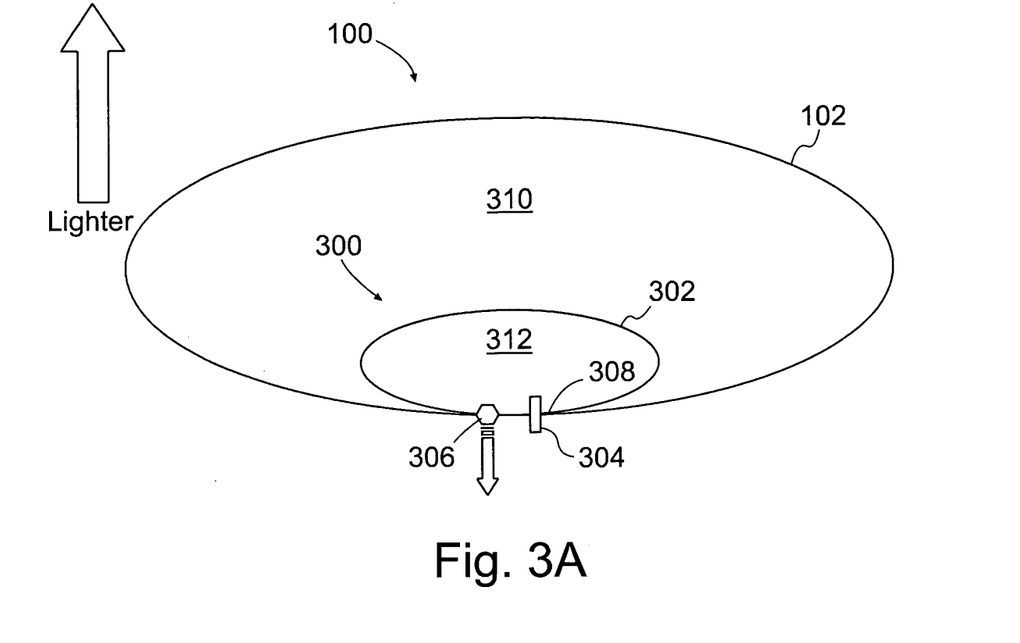
FIG. 3A illustrates a cross-sectional view of an airship having an active density control buoyancy system in equilibrium or ascent (i.e., positive buoyancy) where the hull is under relatively lower pressure according to one embodiment of the invention.

FIG. 3A illustrates a cross-sectional view of the airship 100 with a DCB system 300 in equilibrium or ascent (i.e., positive buoyancy) where the hull 102 is under relatively lower pressure according to one embodiment of the invention. The DCB system 300 is housed within the hull 102 of the airship 100 and employs one or more mechanisms to control the ascent or descent of the airship 300. The DCB system 300 is used to provide the airship 100 with active control of its static weight and to provide vertical control of the airship 100. Additionally, the DCB system 300 is used to compensate for various external factors that might affect the static weight of the airship 100, such as a change in ambient atmospheric conditions, the consumption of fuel, the off-loading of passengers and cargo, or a change in the level of superheat of the helium gas. The DCB system 300 advantageously overcomes many of the drawbacks and inefficiencies of conventional static weight control mechanisms such as ballasting, gas release, dynamic lift and vectored engine thrust. The DCB system 300 does not require the carrying of excess weight, or the release of lifting gas, to compensate for expected weight changes of the airship 100 during flight, or the use of dynamic lift or vectored engine thrust.

The DCB system 300 includes a flexible compartment 302 that is positioned within the hull 102. In one embodiment, the hull 102 is a fixed-volume, gas-filled hull that is in physical contact with the flexible compartment 302. The flexible compartment 302 may be positioned along and in contact with a bottom (e.g., dome-shaped) surface 308 of the hull 102. The flexible compartment 302 is designed to hold air 312 and to control the vertical ascent and descent of the airship 100. The flexible compartment 302 may include an inlet valve and/or pump 304 to control or regulate the flow of the air 312 into the flexible compartment 302 and an outlet valve and/or pump 306 to control or regulate the flow of the air 312 out of the flexible compartment 302. In one embodiment, a single bi-directional pump and/or valve can be used to control or regulate the flow of the air 312 into and out of the flexible compartment 302. The DCB system 300 may include a processor (or a controller) located in the cabin 106 for controlling the functions and operations of the inlet valve and/or pump 304 and the outlet valve and/or pump 306. The pilot of the airship 100 may control or operate the processor.

The flexible compartment 302 may be made of, or include, any material that permits the flexible compartment 302 to expand and contract depending on the pressure differential between a lifting gas 310 (e.g., helium or hydrogen) inside the hull 102 and the air 312 inside the flexible compartment 302. The hull 102 contains the lifting gas 310 that is lighter than air to provide buoyancy or "lift" to the airship 100. In one embodiment, the flexible compartment 302 may be made of a gas-impermeable material to prevent the lifting gas 310 from mixing with the air 312 within the flexible compartment 302. In one embodiment, the flexible compartment 302 is an enclosed volume that expands as outside air is introduced into it and contracts as the air is removed. The flexible compartment 302 may be centrally or peripherally mounted inside the hull 102.

During ascent of the airship 100, as shown in FIG. 3A, the hull 102 is almost completely filled with the lifting gas 310 and the flexible compartment 302 is deflated against the bottom surface 308 of the hull 102. In this configuration, the airship 100 is statically light and does not require the use of dynamic lifting forces or vectored engine thrust to remain airborne. In this configuration, the lifting gas 310 within the hull 102 is under minimal or reduced pressure and the mass of air within the flexible compartment 302 is at a minimum or low amount.

To cause the airship 100 to ascend, the air 312 from inside the flexible compartment 302 is pumped (using the pump 304) or released (using one or more one-way valves 306) into the atmosphere, subtracting mass (i.e., air) from the airship 100 and lowering the density of the lifting gas 310 as it is decompressed. The lifting gas 310 is under pressure and thus pushes on the flexible compartment 302, forcing the air 312 out of the outlet valves 306, as shown in FIG. 3A. The release of the air 312 from the flexible compartment 302 can also be facilitated by the pump 304. The airship 100 thus becomes statically lighter in an amount substantially equal to the mass of air 312 released into the atmosphere and displaced by decompressing lifting gas 310, resulting in increased buoyancy or "lift." In this mode of operation, the lifting gas 310 within the hull 102 is decompressed due to the removal of the air from the flexible compartment 302 and the overall internal pressure exerted on the hull 102 is decreased.

The rate at which the flexible compartment 302 decreases in volume and releases air 312 into the outside atmosphere can be accurately regulated by operation of the inlet valve and/or pump 304 and/or the outlet valve and/or pump 306, which in turn controls the rate of ascent of the airship 100 and the altitude to which it ascends and achieves equilibrium. The ratio of the volume of lifting gas 310 in the hull 102 and the volume of air 312 in the flexible compartment 302 can be altered rapidly and accurately enough to provide a pilot with ample control for all flight maneuvers including take off and landing, in-flight altitude changes, and the loading and unloading of passengers and cargo.

Figure 3B:
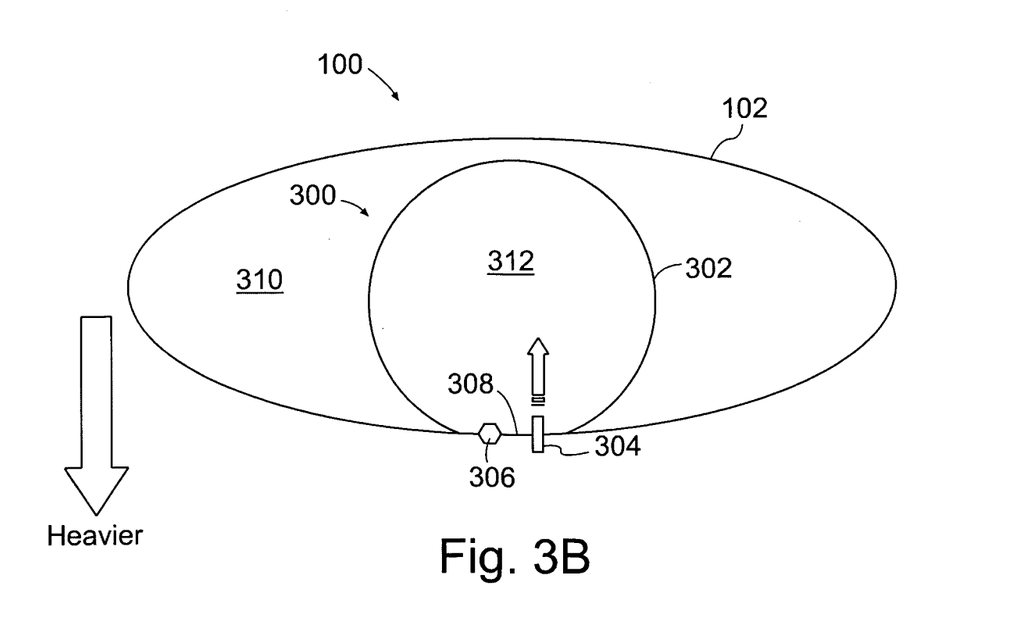
FIG. 3B illustrates a cross-sectional view of an airship having an active density control buoyancy system in descent (i.e., negative buoyancy) where the hull is under relatively higher pressure according to one embodiment of the invention.

FIG. 3B illustrates a cross-sectional view of the airship 100 with a DCB system 300 in descent (i.e., negative buoyancy) where the hull 102 is under relatively higher pressure according to one embodiment of the invention. To cause the airship 100 to descend, air from the outside atmosphere is pumped (using the pump 304) into the flexible compartment 302, thereby adding mass to the airship 100 and increasing the density of the lifting gas 310 as it is compressed. As the outside air is pumped into the flexible compartment 302, the flexible compartment 302 expands and displaces a substantially equal amount of the lifting gas 310. Accordingly, the lifting gas 310 within the hull 102 is compressed and the overall internal pressure exerted on the hull 102 is increased. In this configuration, the airship 100 becomes statically heavier due to the increased mass of the air 312 within the hull 102.

The amount or distance the airship 100 descends can be controlled by pumping or introducing varying amounts of air 312 into the flexible compartment 302. The larger the volume of air inside the flexible compartment 302, the greater the static weight of the airship 100. The airship 100 descends until it once again reaches equilibrium in the denser air at lower altitudes. Once equilibrium is reached, the airship 100 stops descending. If air 312 continues to be pumped into the flexible compartment 302, the airship 100 becomes heavy enough to descend to the ground. The DCB system 300 also has the ability to compensate for operational and/or atmospheric conditions when the airship 100 is flying or is landed or parked. For example, the pilot or the processor may operate the inlet valve and/or pump 304 and/or the outlet valve and/or pump 306 to compensate for changes in temperature, altitude, atmospheric pressure, fuel burn, cargo offloading and/or superheat. The size of the flexible compartment 302 and the operator's ability to displace the lifting gas 310 with air 312 is limited by the maximum pressure differential that can be borne by the hull 102.

Figure 3C:
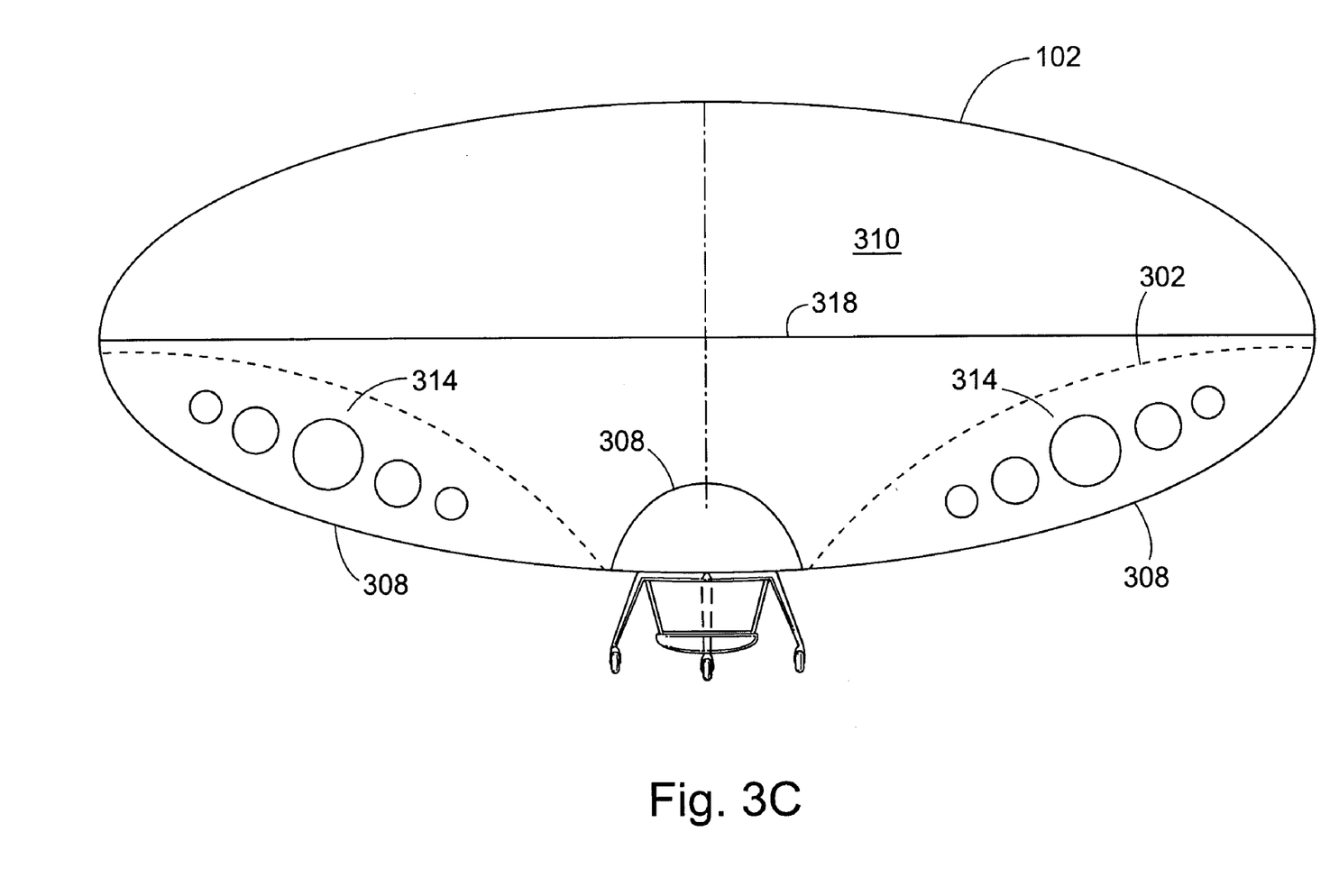
FIG. 3C illustrates a cross-sectional view of an airship having a toroidal-shaped, flexible compartment positioned around a bottom surface of the hull according to one embodiment of the invention.

FIG. 3C illustrates a cross-sectional view of an airship 100 having a toroidal-shaped, flexible compartment 302 positioned around a bottom surface 308 of the hull 102 according to one embodiment of the invention. In one embodiment, the flexible compartment 302 is positioned on the bottom surface 308 of the hull 102. Within the flexible compartment 302, one or more baffles 314 may be used to provide support and stability to the flexible compartment 302. In one embodiment, the flexible compartment 302 includes four (4) baffles 314 that are substantially perpendicular to and equi-spaced around the bottom surface 308 of the hull 102. In between the four (4) baffles 314 are four (4) sections that may contain the air 312. The baffles 314 may be made of the same material as the flexible compartment 302 or a different material such as plastic. The baffles 314 may include one or more holes or passageways to allow and regulate the flow of air 312 from one section of the flexible compartment 302 to another section of the flexible compartment 302. In one embodiment, the baffles 314 are connected or fastened to the bottom surface 308 of the hull 102 to limit the movement of the flexible compartment 302 within the hull 102 and/or to prevent the flexible compartment 302 from shifting away from its position within the hull 102 during the inflation or deflation of the flexible compartment 302. Large movements of the flexible compartment 302 may adversely affect the center of gravity of the airship 100. Cables may be used in addition to the baffles 314 or in place of the baffles 314 to secure and support the flexible compartment 302 within the hull 102.

Figure 3D:
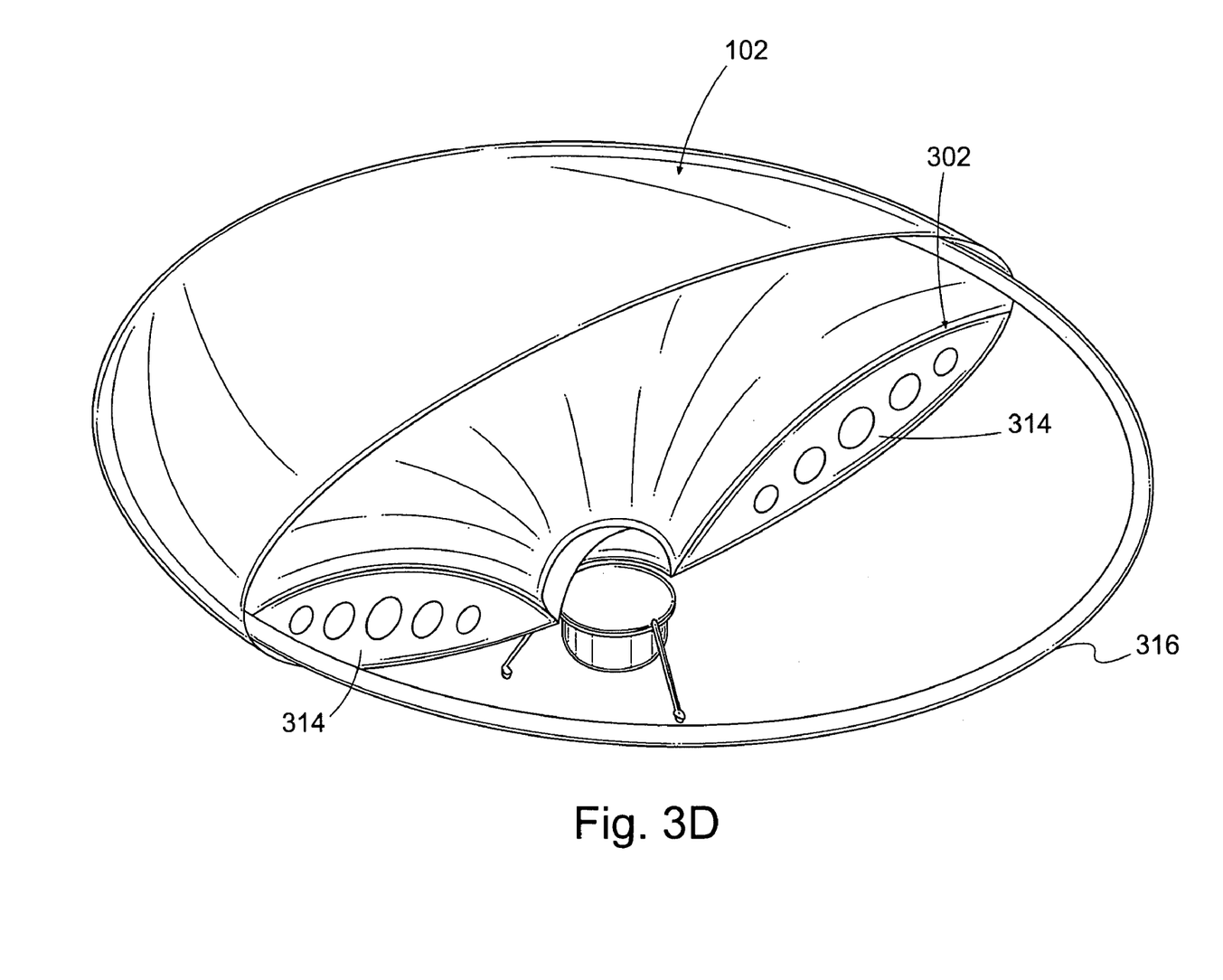
FIG. 3D illustrates a perspective view of the airship of FIG. 3C with a portion of the hull removed to show the flexible compartment positioned within the hull according to one embodiment of the invention.

FIG. 3D illustrates a perspective view of the airship 100 of FIG. 3C with a portion of the hull 102 removed to show the flexible compartment 302 positioned within the hull 102 according to one embodiment of the invention. As shown, the flexible compartment 302 may be shaped like a donut or toroid. Generally, the flexible compartment 302 is located within the bottom half of the hull 102 and below a horizontal plane 318 (see FIG. 3C) defined by a ring 316. The ring 316 is used, among other things, to provide support to the hull 102 and/or the flexible compartment 302 and as an attachment point and mounting surface.

Figure 4A:
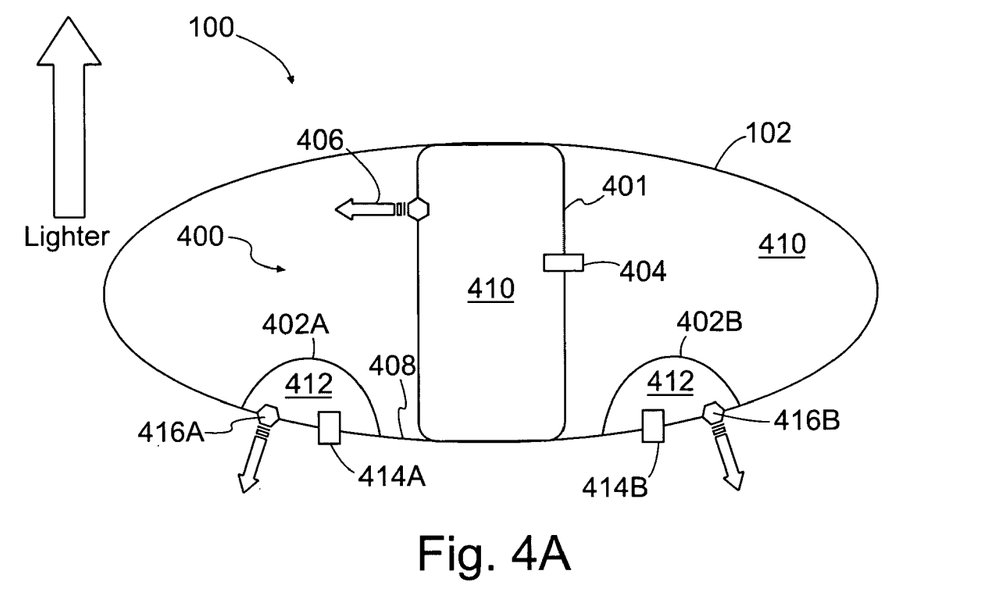
FIG. 4A illustrates a cross-sectional view of an airship including an active DCB system having a pressure tank and one or more flexible compartments where a lifting gas is pumped out of the pressure tank to cause the airship to ascend according to one embodiment of the invention.

FIG. 4A illustrates a cross-sectional view of the airship 100 including an active DCB system 400 having a fixed-volume pressure tank 401 (e.g., a composite pressure vessel) and one or more flexible compartments 402 where a lifting gas 410 is released from or pumped out of the pressure tank 401 to cause the airship 100 to ascend according to one embodiment of the invention. The pressure tank 401 may be a fixed-volume device that contains the lifting gas 410 and may be centrally mounted inside the hull 102. The pressure tank 401 may be in the shape of a cylinder, a ball, a sphere, a prism or any other shape capable of holding a pressurized gas. The one or more flexible compartments 402 (e.g., 402A and 402B) may be located on an inner bottom surface 408 of the hull 102. The pressure tank 401 may include one or more inlet valves and/or pumps 404 and one or more outlet valves and/or pumps 406 to permit the lifting gas 410 to be pumped into and out of the pressure tank 401. The lifting gas 410 is generally compressed into the pressure tank 401 via the pump 404 and is released into the hull 102 via the outlet valve 406. As the lifting gas 410 is released into the hull 102, air 412 is forced out of, or released from, the one or more flexible compartments 402 via the one or more outlet valves and/or pumps 416. The airship 100 becomes statically lighter in an amount substantially equal to the mass of the air 412 forced out of, or released from, the one or more flexible compartments 402 and the airship 100 ascends.

Figure 4B:
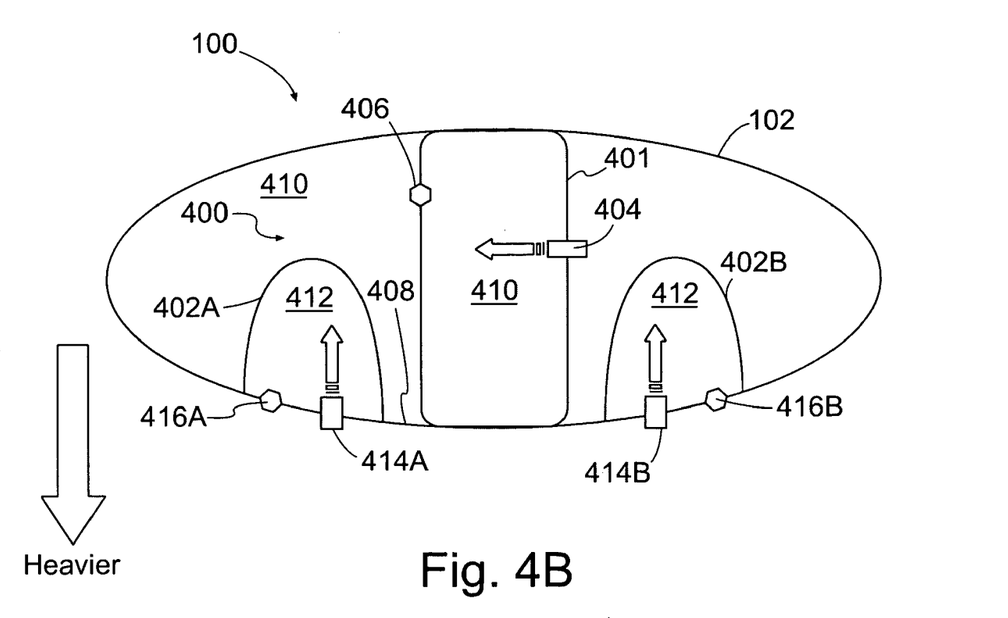
FIG. 4B illustrates a cross-sectional view of an airship including an active DCB system having a pressure tank and one or more flexible compartments where a lifting gas is pumped into the pressure tank to cause the airship to descend according to one embodiment of the invention.

FIG. 4B illustrates a cross-sectional view of the airship 100 including an active DCB system 400 having a pressure tank 401 and one or more flexible compartments 402 where the lifting gas 410 is pumped into the pressure tank 401 and the outside air 412 is introduced into the one or more flexible compartments 402 to cause the airship 100 to descend according to one embodiment of the invention. As the lifting gas 410 is removed from the hull 102 and compressed into the tank 401 via the one or more inlet valves and/or pumps 404, the one or more flexible compartments 402 expand and are filled with the outside air 412 in an amount substantially equal to the volume of the lifting gas 410 that has been pumped from the hull 102 into the pressure tank 401. Thus, the airship 100 becomes statically heavier in an amount substantially equal to the mass of the outside air 412 introduced into the flexible compartments 402. The one or more inlet valves and/or pumps 404 may be used to compress or pump the lifting gas 410 into the pressure tank 401.

The DCB system 400 is designed to place a minimal amount of pressure on the hull 102. Instead of compressing the lifting gas 410 within the hull 102, as in the DCB system 300, the lifting gas 410 is compressed only within the pressure tank 401. The air 412 is pumped into or out of the one or more flexible compartments 402 in response to pressure changes in the lifting gas 410 as it is pumped into or out of the pressure tank 401. The operational effectiveness of the DCB system 400 is limited by the maximum pressure differential that can be borne by the tank 401.

Figure 5A:
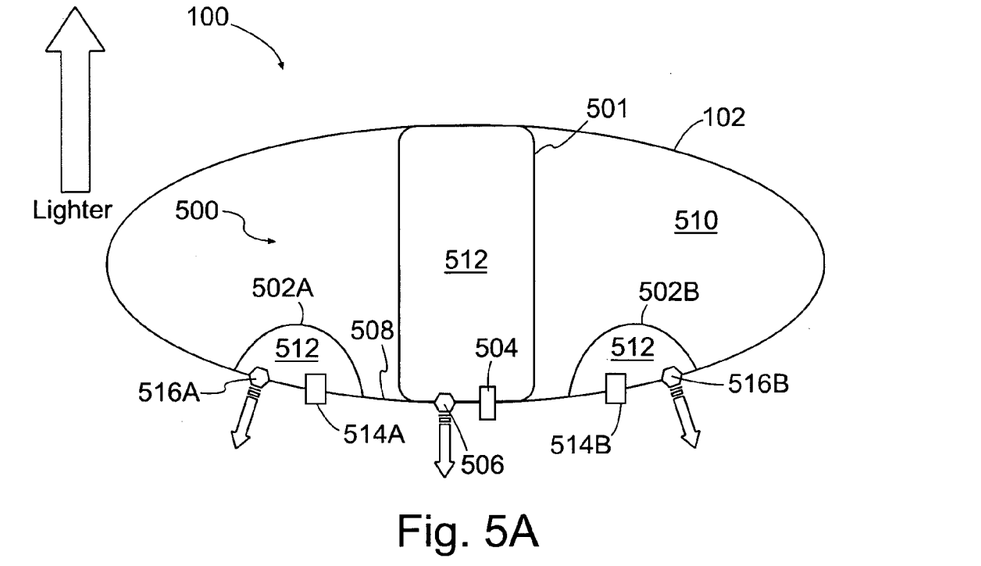
FIG. 5A illustrates a cross-sectional view of an airship including an active DCB system having a pressure tank and one or more flexible compartments where air is pumped out of the pressure tank into the atmosphere to cause the airship to ascend according to one embodiment of the invention.

FIG. 5A illustrates a cross-sectional view of the airship 100 with a DCB system 500 having a tank 501 (e.g., a composite pressure vessel) and one or more flexible compartments 502 (e.g., 502A and 502B) where air 512 is pumped out of the tank 501 into the atmosphere to cause the airship 100 to ascend according to one embodiment of the invention. The tank 501 may be a fixed-volume device that contains air 512 and may be centrally mounted inside the hull 102. The one or more flexible compartments 502 are generally positioned on an inner bottom surface 508 of the hull 102. A lifting gas 510 is contained within or dispersed throughout the hull 102 and surrounds the tank 501 and the one or more flexible compartments 502.

The tank 501 may include one or more inlet valves and/or pumps 504 and one or more outlet valves and/or pumps 506 to permit air 512 to be pumped into and out of the tank 501 to increase and decrease the weight of the airship 100. The air 512 may be released into the atmosphere via the outlet valve and/or pump 506 to cause the airship 100 to ascend. The flexible compartment 502 may also contain air 512 and may be positioned within the hull 102. As the air 512 is forced out of, or released from, the one or more flexible compartments 502 via the one or more valves and/or pumps 516, the flexible compartment 502 diminishes in size, thus reducing the pressure within the hull 102. The airship 100 becomes statically lighter in an amount substantially equal to the mass of the air 512 forced out of, or released from, the tank 501 and the airship 100 ascends. The flexible compartment 502 compensates for changes in the volume of the lifting gas 510 as the airship 100 gains altitude and/or in response to temperature changes. The flexible compartments 502A and 502B may be configured to react to these changes, for example, the air 512 may be forced into the flexible compartments 502A and 502B via the inlet valves and/or pumps 514A and 514B or forced out of the flexible compartments 502A and 502B via the outlet valves and/or pumps 516A and 516B.

Figure 5B:
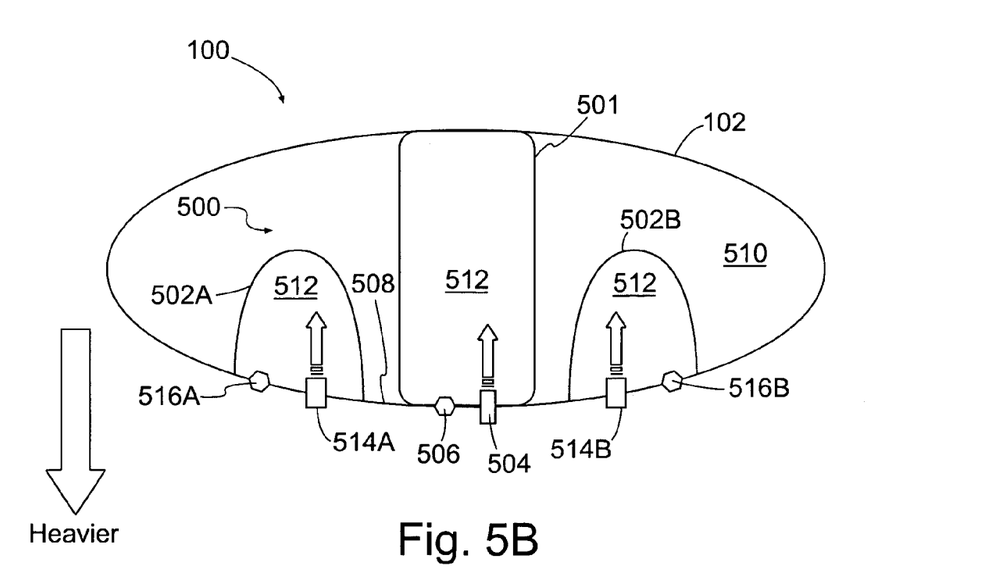
FIG. 5B illustrates a sectional view of an airship including an active DCB system having a pressure tank and one or more flexible compartments where air is pumped into the pressure tank from the atmosphere to cause the airship to descend according to one embodiment of the invention.

FIG. 5B illustrates a cross-sectional view of the airship 100 with a DCB system 500 having the tank 501 and the one or more flexible compartments 502 where the outside air 512 is pumped into the tank 501 from the outside atmosphere to cause the airship 100 to descend according to one embodiment of the invention. As the air 512 is introduced into the tank 501, the airship 100 becomes statically heavier in an amount substantially equal to the mass of the air 512 introduced. The one or more inlet valves and/or pumps 504 may be used to compress or pump the outside air 512 into the tank 501. The flexible compartments 502A and 502B compensate for changes in the volume of the lifting gas 510 as the airship 100 loses altitude and/or in response to temperature changes. The flexible compartments 502A and 502B may be configured to react to these changes, for example, the air 512 may be forced into the flexible compartments 502A and 502B via the inlet valves and/or pumps 514A and 514B or forced out of the flexible compartments 502A and 502B via the outlet valves and/or pumps 516A and 516B.

The DCB system 500 is designed to place a minimal amount of pressure on the hull 102. Instead of compressing the lifting gas 410 within the hull 102, as in the DCB system 300, air 512 is compressed within the tank 501. The air 512 is pumped into or out of the one or more flexible compartments 502 in response to pressure changes in the lifting gas 510 as the airship 100 ascends or descends, or in response to environmental or operational changes. The operational effectiveness of the DCB system 500 is limited by the maximum pressure differential that can be borne by the tank 501.

In one or more of these embodiments, the tank (e.g., 501) is designed to be under maximum or high pressure when the airship 100 is on the ground at sea level (consistent with mission requirements and the pressure strength of the tank) when air or the lifting gas has been pumped into the tank to make the airship heavy enough to land and exchange payload. Whenever the airship 100 is operating at elevations above sea level, the tank pressure is low.

Figure 6A:
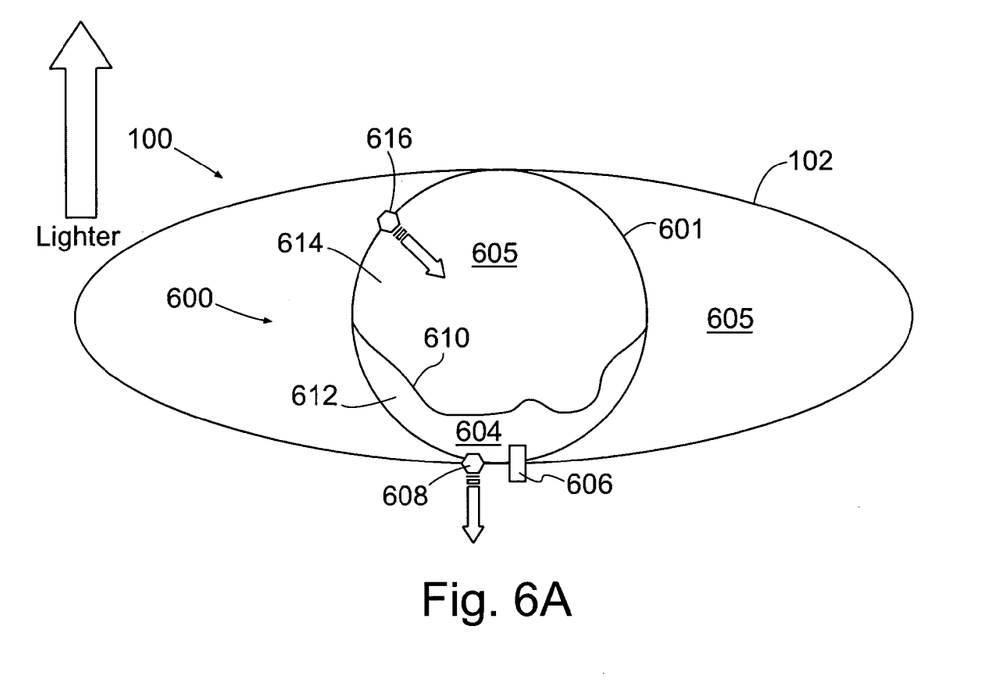
FIG. 6A illustrates a cross-sectional view of an airship including an active DCB system having a pressure tank where air is pumped out of the pressure tank into the atmosphere and a lifting gas is pumped into the pressure tank from within the hull to cause the airship to ascend according to one embodiment of the invention.

FIG. 6A illustrates a cross-sectional view of the airship 100 with a DCB system 600 having a tank 601 (e.g., a composite pressure vessel) where air 604 is pumped out of the tank 601 into the atmosphere allowing a lifting gas 605 to flow into the tank 601, causing the airship 100 to ascend according to one embodiment of the invention. The DCB system 600 includes a divider 610 that separates a first section 612 of the tank 601 from a second section 614 of the tank 601. The divider 610 may be secured at the equator of the tank 601 and may have the shape of a circle or a hemisphere with the same diameter as or a larger diameter than the diameter of the tank 601. In one embodiment, the divider 610 is a non-rigid, flexible, gas impermeable diaphragm or membrane, which can be made from any gas impermeable textile suitable for the purpose, for example, fabrics, plastics and/or polymers. The first section 612 of the tank 601 contains air 604 and the second section 614 of the tank 601 contains the lifting gas 605. The divider 610 is secured to an inner perimeter of the tank 601 so that the air 604 contained in the first section 612 does not interact or mix with the lifting gas 605 contained in the second section 614. The lifting gas 605 contained in the second section 614 of the tank 601 is the same lifting gas that fills the hull 102.

The tank 601 may be a gas-impermeable tank made of metal, composite materials and/or fabric and centrally mounted inside the hull 102. The tank 601 may be shaped and sized to make the airship 100 statically light when substantially full of the lifting gas 605, and statically heavy when substantially full of the air 604. The one or more valves and/or pumps 606 and 608 may be used to control the flow of air 604 into and out of the first section 612 of the tank 601. The one or more valves and/or pumps 616 may be used to control the flow of the lifting gas 605 into and out of the second section 614 of the tank 601 and the main hull area containing the lifting gas 605, as pressure differentials change. The one or more valves and/or pumps 616 allow the lifting gas 605 to be transferred from the hull 102 to and from the tank 601, such that the hull 102 withstands a minimal amount of pressurization sufficient to retain the integrity of the hull 102, with most or all of the pressurization borne by the tank 601. Alternatively, depending on the design of the airship 100 and the relative strengths of the material used to make the hull 102 and the tank 601, the DCB system 600 may be configured and/or operated in such a manner that the pressure can be apportioned as desired between the hull 102 and the tank 601.

The tank 601 is primarily filled with the lifting gas 605 to provide the maximum amount of lift. In this instance, some air 604 is released from and/or forced out of the first section 612 of the tank 601 and into the atmosphere, reducing the static weight of the airship 100. That is, the second section 614 of the tank 601 is filled with the lifting gas 605 while the air 604 is removed from the first section 612 of the tank 601, thus creating a higher ratio of lifting gas 605 to air 604 within the tank 601. The one or more valves and/or pumps 616 may be used to maintain the flow rate of the lifting gas 605 into the tank 601, such that the pressure differential between the hull 102 and the outside atmosphere is kept at a desired level. As the tank 601 is filled with the lifting gas 605, the divider 610 is pushed against or near the bottom half of the tank 601. With the second section 614 under a positive pressure, the lifting gas 605 pushes the air 604 out of the tank 601 and additionally, the one or more valves and/or pumps 606 and 608 may be used to remove the air 604 from the first section 612 of the tank 601.

Figure 6B:
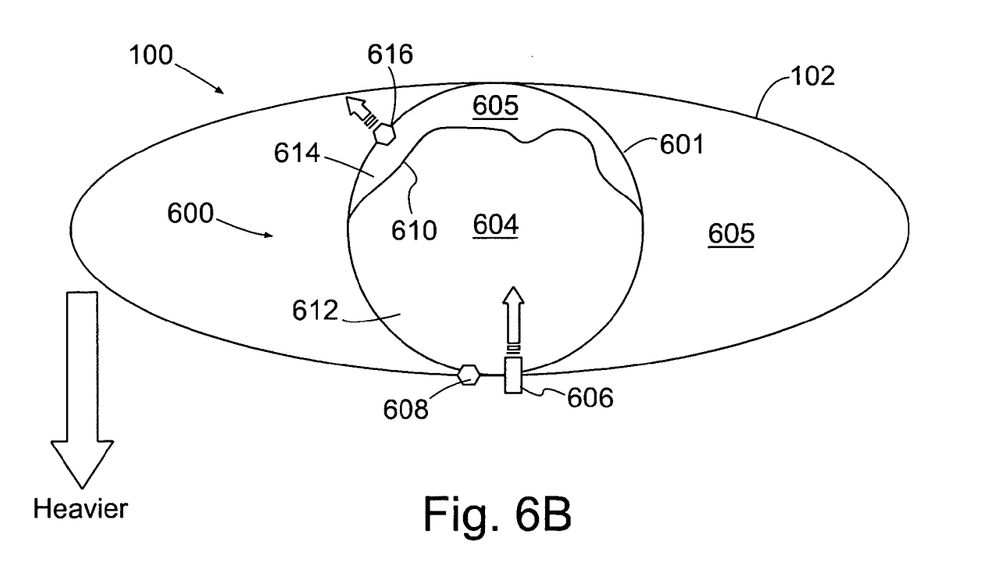
FIG. 6B illustrates a cross-sectional view of an airship including an active DCB system having a pressure tank where air is pumped into the pressure tank from the atmosphere and a lifting gas is pumped out of the tank and into the hull to cause the airship to descend according to one embodiment of the invention.

FIG. 6B illustrates a cross-sectional view of the airship 100 with a DCB system 600 having the tank 601 where air 604 is pumped into the tank 601 from the atmosphere and a lifting gas 605 is pumped out of the tank 601 into the hull 102 to cause the airship 100 to descend according to one embodiment of the invention. To cause the airship 100 to descend, the outside air 604 is pumped into the first section 612 of the tank 601 by the one or more valves and/or pumps 606, forcing the lifting gas 605 in the second section 614 of the tank 601 back into the hull 102 via the one or more valves and/or pumps 616, thus creating a higher ratio of air 604 to the lifting gas 605 within the tank 601. Additionally, the lifting gas 605 may also be actively pumped from the second section 614 of the tank 601 into the hull 102 through the one or more valves and/or pumps 616. Alternatively, the lifting gas 605 may be compressed within the second section 614 of the tank 601 rather than released into the hull 102 through the one or more valves and/or pumps 616, in which case the pressure differential will be borne by the tank 601 rather than the hull 102. The air 604 and the lifting gas 605 are prevented from mixing by the divider 610. As the outside air 604 moves into the first section 612 of the tank 601, the airship 100 becomes statically heavier.

The airship 100 becomes statically heavier in an amount substantially equal to the mass of the air pumped onboard and, if the tank 601 is designed large enough and sufficient air is pumped into it, the airship 100 becomes statically heavy enough to descend to the ground and remain on the ground even after a significant amount of payload is offloaded. By accurately controlling the different amounts of the lifting gas 605 in the second section 614 of the tank 601, and the air 604 in the first section 612 of the tank 601, the weight of the airship 100 can be precisely controlled, thereby providing the pilot with full vertical control of the airship 100 at all times.

The various DCB systems may compensate for changes in operating conditions (e.g., pressure and temperature changes, fuel consumption, the loading and offloading of payload, etc.). For example, a pilot may operate the DCB system to compensate for a change in the static weight of the airship 100 caused by superheat, whether on the ground or in flight.

Another embodiment of the invention provides for one or more controllers to control the operation of the valves and/or pumps of the various DCB systems described above. That is, a controller may operate the inlet and/or outlet valves and/or pumps to reach a desired altitude and/or static weight. A plurality of sensors may provide the controller with the necessary information to determine when one or more of the inlet and/or outlet valves and/or pumps should be operated. For example, pressure and/or temperature sensors may monitor the pressures in the hull, the flexible compartment(s), tank(s), and/or the outside ambient pressure and temperature in order to determine proper pressure differentials and/or absolute pressures. These pressure and temperature readings can be used by the controller to operate the inlet and/or outlet valves and/or pumps so as to reach a desired static weight, internal pressure and/or altitude for the airship. Some or all of the inlet and/or outlet valves and/or pumps may be fitted with automatic controls, independent of all other flight control systems, which are programmed to automatically operate should pressures reach preset levels either high or low. As necessary, some or all of the valves and/or pumps may be provided with completely independent, manually operated controls so that they may be directly operated by flight personnel, in case of an emergency, without the need for an electronic interface.

Another embodiment of the invention, for those systems involving one or more flexible compartments, provides the ability to actively control the flight characteristics of the airship. By altering the mass of air in one or more of the flexible compartments, for example, the center of buoyancy and/or center of gravity can be shifted to various points within the airship. By altering the center of buoyancy and/or center of gravity, one can actively control the airship's balance, trim, angle of attack and/or dynamic lift.

While various airships have been described, the inventions disclosed herein may be implemented in various types of applications (e.g., blimps, airships, "hybrid" aircraft, underwater craft, submarines, etc.) and mediums where buoyancy control is desired. Note that the size and dimensions of the hull, flexible compartment(s), and tank(s) may vary depending on the application, the materials available, and the vertical control response desired.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A system for controlling the aerostatic lift of an airship, comprising:
    a self-supporting monocoque hull made of a gas-impermeable material and containing a first gas under an internal pressure greater than an external pressure outside the self-supporting monocoque hull;
    a compartment located within the self-supporting monocoque hull and containing a second gas;
    a first device coupled to the compartment to control a flow of the second gas into the compartment to increase the static weight of the compartment and to increase the internal pressure and out of the compartment to decrease the static weight of the compartment and to decrease the internal pressure;
    at least two propulsion devices positioned at opposite ends of the self-supporting monocoque hull; and
    a cabin coupled to the self-supporting monocoque hull, the cabin does not provide structural support to the self supporting monocoque hull.

2. The system of claim 1 wherein the self-supporting monocoque hull has a fixed-volume.

3. The system of claim 1 wherein the first gas is lighter than the second gas.

4. The system of claim 1 wherein the first gas is helium and the second gas is air.

5. The system of claim 1 wherein the compartment is a fixed-volume tank.

6. The system of claim 1 wherein the compartment is a flexible compartment.

7. The system of claim 1 wherein the first device is a valve.

8. The system of claim 1 wherein the first device is a pump.

9. The system of claim 1 further comprising a tank configured to contain at least a portion of the first gas.

10. The system of claim 9 further comprising a second device coupled to the tank to control a flow of the first gas into the tank to decrease the static weight of the tank and out of the tank to increase the static weight of the tank.

11. The system of claim 10 wherein the second device is a valve.

12. The system of claim 10 wherein the second device is a pump.

13. A system for controlling the aerostatic lift of an airship, comprising:
    a self-supporting monocoque hull having an inner surface and configured to hold a lifting gas under a pressure greater than atmospheric pressure, the lifting gas being in contact with the inner surface of the self-supporting monocoque hull;
    a flexible compartment contained within the self-supporting monocoque hull and configured to hold air;
    a first device coupled to the flexible compartment for allowing air into the flexible compartment to expand the flexible compartment and increase the pressure of the lifting gas and for removing air from the flexible compartment to contract the flexible compartment and decrease the pressure of the lifting gas; and
    a cabin coupled to the self-supporting monocoque hull, the cabin does not provide structural support to the self-supporting monocoque hull.

14. The system of claim 13 wherein the flexible compartment is positioned on a bottom surface of the self-supporting monocoque hull.

15. The system of claim 13 wherein the flexible compartment is made of a gas-impermeable material and has a toroidal shape.

16. The system of claim 13 further comprising one or more baffles positioned within the flexible compartment to partition the flexible compartment into one or more sections, for providing support and stability to the flexible compartment, and for regulating the air flow between the one or more sections.

17. The system of claim 13 wherein the first device is selected from a group consisting of a controller, a pump, a valve, and combinations thereof.

18. The system of claim 13 further comprising a tank configured to hold at least a potion of the lifting gas.

19. The system of claim 18 further comprising a second device coupled to the tank to control a flow of the lifting gas from the self-supporting monocoque hull to the tank to increase the pressure of the lifting gas in the tank and from the tank to the self-supporting monocoque hull to decrease the pressure of the lifting gas in the tank.

20. A system for controlling the aerostatic lift of an airship, comprising:
    a self-supporting monocoque hull made of a gas-impermeable material arid configured to hold a lifting gas;

a first flexible compartment contained within the self-supporting monocoque hull and configured to hold air that is above atmospheric pressure;

a first outlet device for releasing air from the first flexible compartment to decrease the static weight of the airship;

a first inlet device for introducing air into the first flexible compartment to increase the static weight of the airship; and a cabin coupled to the self-supporting monocoque hull, the cabin does not provide structural support to the self-supporting monocoque hull.

21. The system of claim 20 wherein the first outlet device is a valve and the first inlet device is a pump.

22. The system of claim 20 further comprising a second flexible compartment contained within the self-supporting monocoque hull and configured to hold air.

23. The system of claim 22 further comprising:

a second outlet device for releasing air from the second flexible compartment to decrease the static weight of the airship; and a second inlet device for introducing air into the second flexible compartment to increase the static weight of the airship.

24. The system of claim 20 further comprising a tank positioned within the self-supporting monocoque hull.

25. The system of claim 24 further comprising a device coupled to the tank to control a flow of the lifting gas from the self-supporting monocoque hull to the tank to increase the pressure of the lifting gas in the tank and from the tank to the self-supporting monocoque hull to decrease the pressure of the lifting gas in the tank.

26. The system of claim 24 further comprising a device coupled to the tank to control a flow of air into the tank to increase the static weight of the airship and out of the tank to decrease the static weight of the airship.

27. A system for controlling the aerostatic lift of an airship, comprising:

a single lenticular self-supporting hull made of a gas-impermeable material and containing a first gas under an internal pressure greater than an external pressure outside the single lenticular self-supporting hull;

a compartment located within the single lenticular self-supporting hull and containing a second gas;

a first device coupled to the compartment to control a flow of the second gas into the compartment to increase the static weight of the compartment and to increase the internal pressure and out of the compartment to decrease the static weight of the compartment and to decrease the internal pressure;

at least two propulsion devices positioned at opposite ends of the single lenticular self-supporting hull; and a cabin coupled to the single lenticular self-supporting hull, the cabin does not provide structural support to the single lenticular self-supporting hull.

28. The system of claim 27 further comprising a tank configured to contain at least a portion of the first gas.

29. The system of claim 28 further comprising a second device coupled to the tank to control a flow of the first gas into the tank to decrease the static weight of the tank and out of the tank to increase the static weight of the tank.

30. The system of claim 27 wherein the first device is selected from a group consisting of a controller, a pump, a valve, and combinations thereof.

* * * * *